(12) United States Patent
Yoo

(10) Patent No.: US 6,922,403 B1
(45) Date of Patent: Jul. 26, 2005

(54) ACOUSTIC ECHO CONTROL SYSTEM AND DOUBLE TALK CONTROL METHOD THEREOF

(75) Inventor: Jae Ha Yoo, Koyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/100,946

(22) Filed: Jun. 22, 1998

(30) Foreign Application Priority Data

Jun. 25, 1997 (KR) ............................................ 97/27057

(51) Int. Cl.⁷ ................................................ H04B 3/20
(52) U.S. Cl. .................. 370/286; 370/288; 379/406.07; 379/406.08
(58) Field of Search ................................ 370/276, 277, 370/286–287, 288, 290; 379/406.07, 406.08

(56) References Cited

U.S. PATENT DOCUMENTS

| | | | | |
|---|---|---|---|---|
| 5,136,577 A | * | 8/1992 | Amano et al. | 370/289 |
| 5,396,488 A | * | 3/1995 | Lahdemaki | 370/288 |
| 6,035,033 A | * | 3/2000 | Von Pfeil et al. | 370/289 |

* cited by examiner

Primary Examiner—William Luther
(74) Attorney, Agent, or Firm—Birch, Stewart, Kolasch & Birch, LLP

(57) ABSTRACT

An acoustic echo control system and a double talk control method thereof that eliminate echo signals which are generated in a hand-free communication system. In order to discriminate a double talk generation and a change of an echo path, the acoustic echo control system accurately detects a double talk section and an echo path change section using a near end signal from a near end talker and a far end signal from a far end talker and in the double talk section an adaptive echo remover of the system suspends a filter coefficient adaption and estimates an acoustic echo path which is supplied to a microphone over a speaker by performing the filter coefficient adaption in the echo path change section, thereby improving communication quality and discriminating the double talk and the change of the echo path without time delay.

16 Claims, 2 Drawing Sheets

ACOUSTIC ECHO CONTROL SYSTEM AND DOUBLE TALK CONTROL METHOD THEREOF

BACKGROUND OF THE INVENTION

1. Field of the Invention

The present invention relates to an acoustic control system and a double talk control method thereof, and more particularly to an acoustic echo control system and a double talk control method thereof for interrupting an operation of an adaptive filter for removing acoustic echoes. In a double talk by detecting a double talk and a change of an echo path without time delay.

2. Description of the Prior Art

A hand-free communication system which does not apply a hand-set is applied to various fields such as a teleconference system, a speaker phone, etc. in order to promote convenience and stability of a speaker. Further in some countries, telephones installed in vehicles should legally follow the hand-free communication system for traffic safety.

However, in the hand-free communication system, acoustic echoes are generated though a path among a speaker, a space wherein a speaker is located and a microphone and thus communication quality is deteriorated. Accordingly, there is required an acoustic echo control system that removes the acoustic echoes. An echo controller which applies an echo removing system solves a half-duplex communication, the problem of an echo controller which applies an echo suppression system, and thus a full-duplex communication becomes possible with that controller.

In addition, since characteristics of the acoustic echoes are varied in accordance with a time change, the acoustic echo control system applies an adaptive digital filter and differently operates in accordance with a communication condition. Specifically, since coefficient radiation may be incurred when performing coefficient adaption of the adaptive digital filter in a double talk section in which speakers simultaneously talk, a double talk detecting operation is required to prevent the coefficient radiation.

To remove such echoes, although the adaptive digital filler is applied, the filter coefficient radiation in the double talk should be prevented. Accordingly, in order to achieve the double talk detection which is required according to the necessity of preventing the coefficient radiation, there has been introduced a method which applies a method of comparing sizes of signals and a method of using correlation.

An echo path may changed due to increase of a speaker volume, movement of the speaker or door opening/closing. However, with the above methods the double talk can be detected, but the double talk generation and the echo path change can not be distinguished. Furthermore, the above methods have a tendency to stick to an operation system which is not suitable for the acoustic echo control system.

For example, according to U.S. Pat. No. 5,136,577, there is introduced a method, suitable for the acoustic echo controller, which is capable of adapting a filter coefficient and discriminating the change of the double talk from the change of the echo channel. The above method applies a value of echo return loss enhancement (ERLE).

However, the problem of the conventional method is that since the value of ERLE is changed even in accordance with size of an input signal, when an actual signal is applied, an erroneous detection of double talk may be caused by which the value of ERLE is frequently changed although there is no change of the double talk or the echo channel. Thus, the conventional method is not suitable to be embodied into an actual system.

SUMMARY OF THE INVENTION

The first object of the present invention is to provide an acoustic echo control system and a double talk control method thereof that eliminate acoustic echoes when using a hand-free telephone.

The second object of the present invention is to provide an acoustic echo control system and a double talk control method thereof that provides a high-quality telephone communication by which a double talk generation and a change of an echo path are detected on the basis of signals from a near end talker and a far end talker, thereby suspending a filter coefficient adaption operation of an adaptive echo remover when detecting the double talk state and performing the filter coefficient adaption operation when the each path is changed.

The third object of the present invention is to provide an acoustic echo control system and a double talk control method thereof that discriminates a double talk state and a change of an echo path without time delay.

To achieve the objects of the present invention, there is provided an acoustic echo control system which includes an adaptive echo remover estimating an echo signal corresponding to a far end signal of a far end talker, thus generating the echo signal, a double talk detecting unit detecting a double talk state on the basis of a near end signal of a near end talker, the far end signal and the echo signal and a controller suspending an operation of the adaptive echo remover in the double talk state in accordance with an output signal from the double talk detecting unit.

In the acoustic echo control system, the double talk detecting unit includes a double talk detecting prediction unit receiving the near end signal in which a near end talker signal is mixed with an echo signal in accordance with the far end signal of the far end talker and computing a reflection coefficient variation which indicates a characteristic of a sound signal, a threshold value determining lattice prediction unit receiving the near end signal and estimating a reflection coefficient variation with respect to the far end signal using the reflection coefficient of the sound signal, thereby computing a threshold value for the double talk detection and a double talk determining unit receiving and comparing output signals from the double talk detecting and threshold value determining lattice prediction units and accordingly determining the double talk state.

Further, to achieve the objects of the present invention, there is provided a double talk control method of an acoustic echo control system which includes the steps of computing a reflection coefficient variation of a far end signal from a far end talker and a reflection coefficient variation of a near end signal in which a near end talker signal and an echo signal in accordance with the far end signal are compounded, computing a threshold value for detecting a double talk state from the reflection coefficient variation of the far end signal, comparing the threshold value and the reflection coefficient variation of the near end signal, and suspending a filter coefficient adapting operation of an adaptive echo remover which generates an estimated echo signal from the echo signal when the reflection coefficient variation of the near end signal is larger than the threshold value, or eliminating the echo signals by adapting filter coefficients when the reflection coefficient variation is not larger than the threshold value.

Also, there is provided a double talk detecting method of an acoustic echo control system, which includes the steps of computing a reflection coefficient variation of a far end signal from a far end talker and a reflection coefficient variation of a near end signal in which a near end talker signal and an echo signal in accordance with the far end signal are compounded, computing a threshold value for detecting a double talk state from the reflection coefficient variation of the far end signal, comparing the threshold value and the reflection coefficient variation of the near end signal and, when the reflection coefficient variation of the near end signal is larger than the threshold value, determining that a double talk is generated and detecting the double talk.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, an example of which is illustrated in the accompanying drawings.

Figure 1:
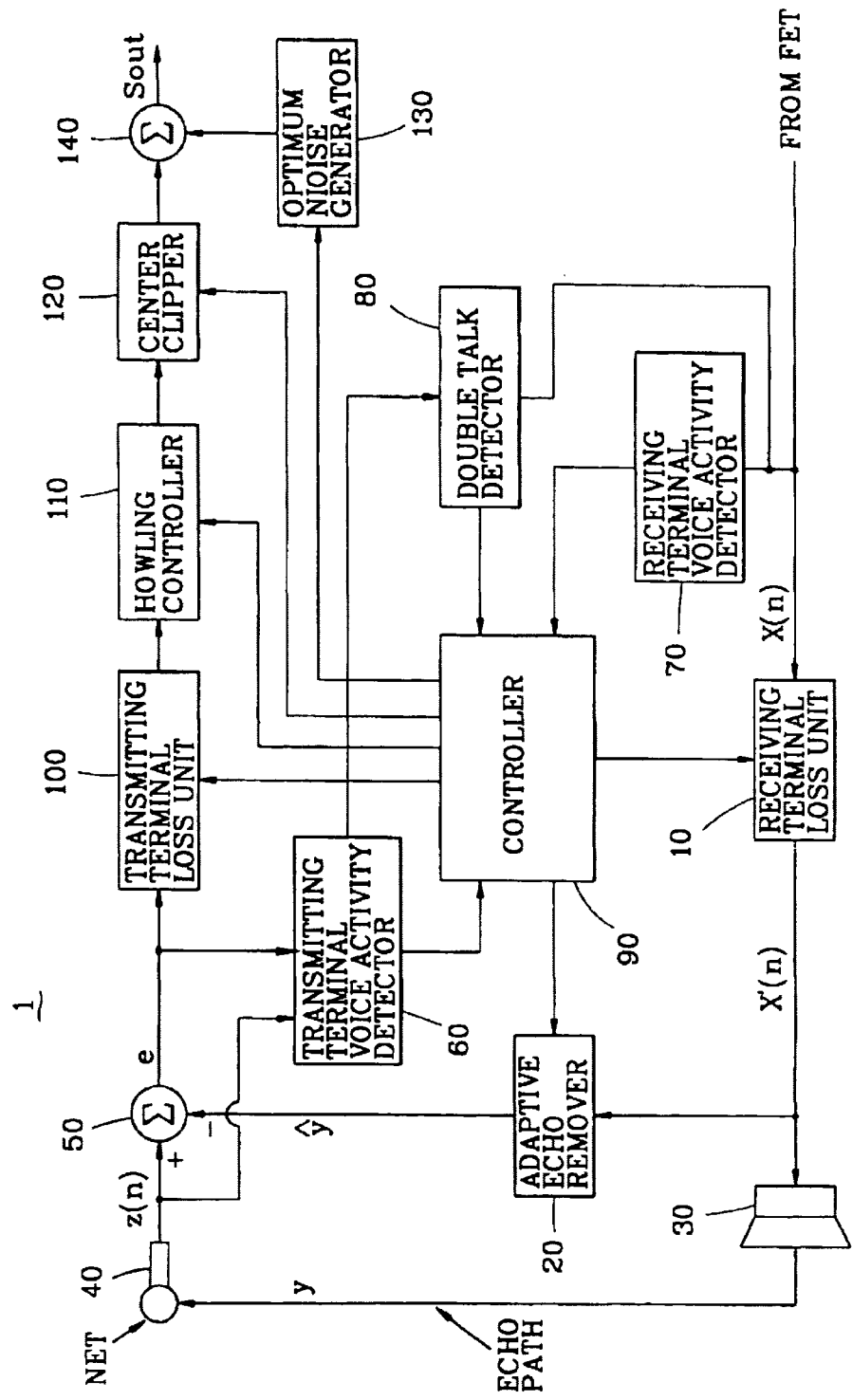
FIG. 1 is a schematic block diagram of an acoustic echo control system according to an embodiment of the present invention.

FIG. 1 is a schematic block diagram of an acoustic echo control system according to a preferred embodiment of the present invention. In FIG. 1, an acoustic echo control system 1 is provided between a microphone 40 for receiving a voice from a near end talker (NET) and a speaker 30 for transmitting a signal from a far end talker (FET) to the NET. The acoustic echo control system 1 outputs a near end signal outputted from the microphone 40 as a signal Sout which will be transmitted to the FET and transmits a signal outputted from the FET over the speaker 30 to the NET. The acoustic echo control system 1 eliminates a FET signal since the FET signal is transmitted to the NET over the speaker 30 and may be inputted to the microphone 40 and return to the FET.

Now, the detail description of the acoustic echo control system 1 according to the present invention will be made.

As shown in FIG. 1, the acoustic echo control system 1 includes a receiving terminal loss unit 10, an adaptive echo remover 20, a subtracter 50, a transmitting terminal voice activity detector 60, a receiving terminal voice activity detector 70, a double talk detector 80, a transmitting terminal loss unit 100, a howling controller 110, a center clipper 120, an optimum noise generator 130, an adder 140 and a controller 90, all operatively coupled.

To describe the operation of the system 1, first a signal from the FET is inputted to the receiving terminal loss unit 10 and the receiving terminal voice activity detector 70, respectively. A FET signal x(n) from the FET is supplied to the adaptive echo remover 20 over the receiving terminal loss unit 10, and converted to an analog signal by a digital to analog converter (not shown) and transmitted to the speaker 30.

The adaptive echo remover 20 estimates an actual echo signal from a FET signal x(n) which is supplied thereto over the receiving terminal loss unit 10 by adapting to a coefficient of an internal adaptive filter and supplies an estimated echo, signal (y) to an inversion terminal (−) of the subtracter 50.

The echo signal (y), which has been estimated in accordance with the FET signal x(n) and transmitted over the speaker 30 to an indoor space, is transmitted to the NET and may return to the FET over the microphone 40. Here, an input signal from the NET and the echo signal (y) are digitalized by an analog to digital converter (not shown), and a signal into which the two signals are mixed is a near end signal z(n) which is inputted to a non-inversion terminal (+) of the subtracter 50 and the subtracter 50 outputs a residuary echo signal (e) by subtracting the echo signal (y) which is estimated in the adaptive echo remover 20 from the near end signal z(n) supplied from the microphone 40.

The transmitting terminal voice activity detector 60 receives the near end signal z(n) and the residuary echo signal (e) from the subtracter 50, respectively, and determines whether there exist the near end signal and, residuary echo signal and supplies a resultant to the controller 90. Also, the receiving terminal voice activity detector 70 informs the controller 90 whether there is any signal supplied from the FET.

In a double talk section in which the FET and the NET simultaneously talk, due to the double talk, a near end signal in accordance with the NET is additionally included to the residuary echo signal (e) of which the echo according to the FET signal is removed, thus a filter coefficient of the adaptive echo remover 20 is destroyed. Accordingly, it is an important feature to have the double talk detector 80 which detects the double talk and informs the controller 90.

When the double talk is detected in the double talk detector 80, the controller 90 first controls the adaptive echo remover 20 to suspend the adaption of the adaptive filer coefficient since the near end signal is included in the residuary echo signal (e) and controls the other components, thus the talk is being continued. The details of the double talk detector 80 will be later described.

The transmitting terminal loss unit 100 gives an adequate loss to a transmitting terminal in accordance with the control of the controller 90, the howling controller 110 detects and controls a howling in accordance with the control operation of the controller 90, and the center clipper 120 removes the echo signal which has not been completely removed by the adaptive echo remover 20 by performing a center clipping operation and outputs a signal in which the echo signal is removed to the adder 140. Then, the adder 140 outputs a signal Sout by compounding the signal in which the echo signal has been completely removed by the center clipper 120 and a surrounding noise supplied from the optimum noise generator 130.

Figure 2:
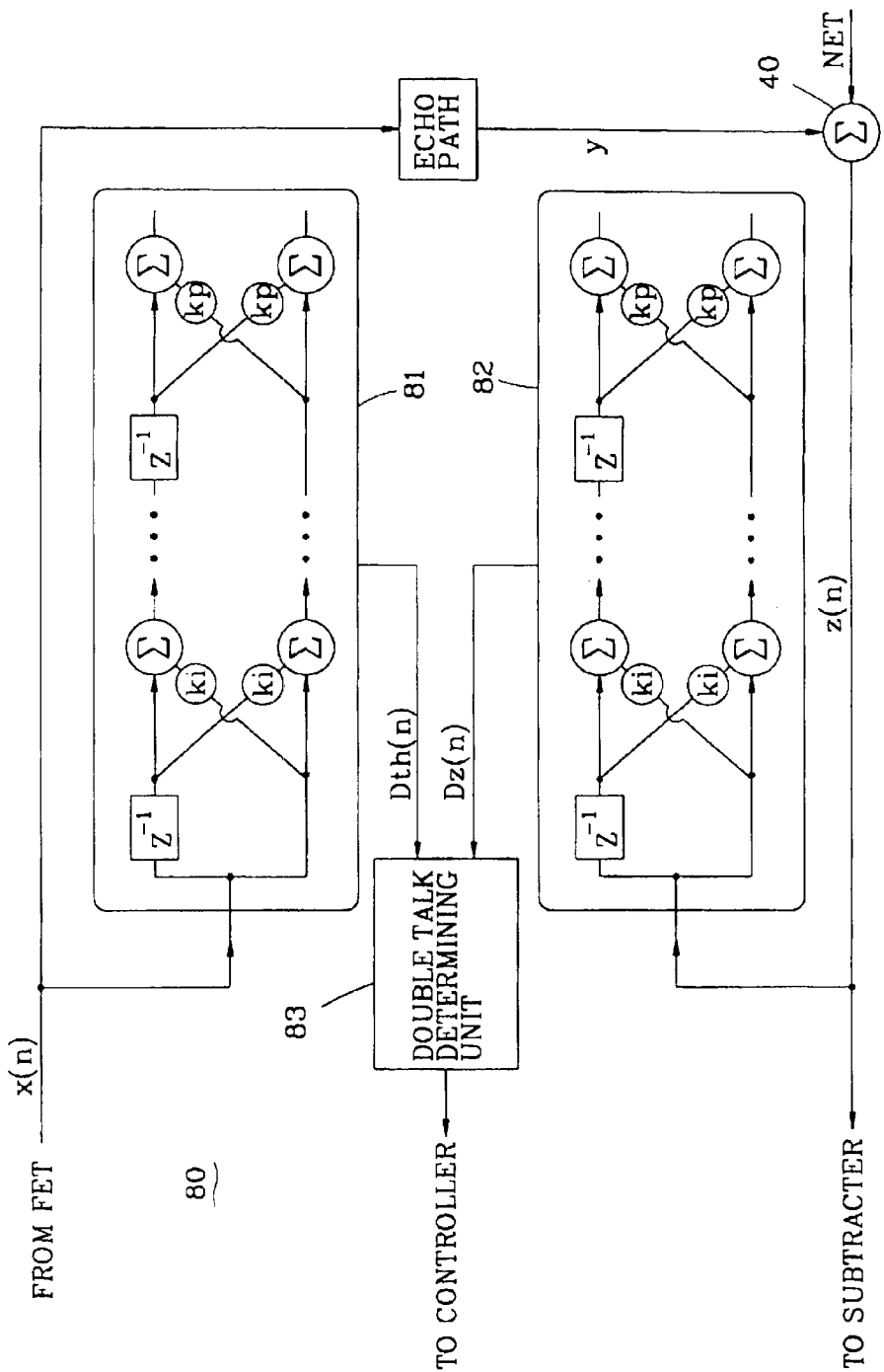
FIG. 2 is a detail block diagram of a double talk detector in FIG. 1 according to an embodiment of the present invention.

With reference to FIG. 2, the double talk detector 80 will be described in detail.

The double talk detector 80 according to an embodiment of the present invention includes a double talk detecting lattice prediction unit 82 for detecting a double talk by responding to the near end signal z(n) for which the NET signal and the echo signal (y) are compounded by the microphone 40, a threshold value determining lattice prediction unit 81 for computing a threshold value for detecting the double talk by responding to an input signal from the FET and a double talk determining unit 83 for determining a change of the double talk and echo path by receiving output signals from the lattice prediction units 81, 82.

The operation of the double talk detector 80 will be explained as follows. The near end signal z(n) in accordance with the double talk further includes a signal a statistic character of which is utterly different from the digitalized echo signal y(n). In addition, since the signal from the NET has a higher level than the echo signal y(n), the statistic character thereof. Is greatly changed when the NET signal is commenced, thereby the detector 80 receives the near end signal z(n) and a variation of a reflection coefficient of the double talk grid prediction unit 82 becomes larger.

When a talker increases a speaker volume or makes a move, or when a door is closed/opened, the echo path may be changed. Since the change of the statistic character is minute, the variation of the reflection coefficient of theses cases becomes smaller than that of the double talk. However, since the reflection coefficient is varied in the case where the echo path is changed, to prevent this case from being considered as the double talk case, the double talk detector 80 estimates a reflection coefficient variation $D_z(n)$, as shown in Equation (1), and compares the same to a selected threshold value, for thereby determining whether the variation corresponds to the double talk or to the change of the echo path.

$$D_z(n) = \frac{\sum_{i=1}^{r}[K_i(n) - K_i(n-T)]^2}{\sum_{i=1}^{r}[K_i(n)]^2} \times 100 \qquad \text{Equation (1)}$$

In Equation (1), in the grid prediction unit of a pth degree, r is a degree in which there is a reflection coefficient having an effective value, K is a parameter having a characteristic of a voice signal, wherein $K_t(n)$ is a reflection coefficient in a discrete time n and $K_t(n-T)$ is a reflection coefficient from the time n to a sample T.

The reflection coefficient variation $D_z(n)$ unexpectedly becomes larger when the double talk is generated. However, if value is greatly varied although the echo path is changed, as described above, the double talk detector 80 considers that case as the double talk and thus suspends the adaptation of the filter coefficient. The above problem can be settled from the following consideration.

The echo path is changed in the acoustic echo control system, when the talker increases the speaker volume or makes a move, or when the door is closed/opened. Since the statistic character of the near end signal z(n) from the NET is not varied, the reflection coefficient variation $D_z(n)$ is little changed.

In addition, when there is any change of surrounding environment, the statistic character of the near end signal is changed in a corresponding section of the echo path, thus the change of the statistic character thereof. Is much smaller than the case where the signal from the NET is commenced.

However, the reflection coefficient variation $D_z(n)$ may increase although a statistic character of the FET signal x(n) from the FET is changed, that is when a statistic character between neighboring phonemes is drastically changed. Thus, by providing a grid prediction unit corresponding to the FET signal x(n), the information of change of the FET signal characteristic can be obtained.

When a reflection coefficient variation to the FET signal x(n) is expressed in $D_x(n)$, the operation of the double talk detector 80 according to the present invention is as follows.

(1) first, the threshold value determining grid prediction unit 81 computes the reflection coefficient variation $D_x(n)$ with respect to the FET signal x(n).

(2) From the computation result of the reflection coefficient variation $D_x(n)$, the threshold value determining grid prediction unit 81 computes a threshold value $D_{th}(n)$ in order to detect a double talk therefrom. Here, the threshold value $D_{th}(n)$ is computed by an Equation (2) as follows.

$$D_{th}(n) = y \times \max\{D_x(n-C), D_x[n-(C+1)], \ldots, D_x(n-M)\}\ldots \qquad (2)$$

Wherein, y is a constant, C is a value which time delay due to a direct path of the echo path is considered and M is a range of a previous value which is under consideration for effects of the indoor space. Further, y is larger than 1 and should be set up considering an echo signal-to-noise ratio, because when y is a small value, the double talk is detected sensitively but the change of the statistic character of the sound signal might be determined as the double talk.

(3) At this time, the double talk detecting grid prediction unit 82 computes the reflection coefficient variation $D_z(n)$ with respect to the near end signal z(n).

(4) The threshold value determining grid prediction unit 81 and the double talk detecting grid prediction unit 82 output a threshold value Dth(n) corresponding to the FET signal x(n) and the reflection coefficient variation $D_z(n)$, respectively, to the double talk determining unit 83.

(5) Next, the double talk determining unit 83 compares the two inputted values therefrom. When the reflection coefficient variation $D_z(n)$ with respect to the near end signal z(n) is larger than the threshold value $D_{th}(n)$ corresponding to the FET signal x(n), the unit 83 determines it is a double talk state, while when the reflection coefficient variation $D_z(n)$ with respect to the near end signal z(n) is smaller than the threshold value Dth(n) corresponding to the FET signal x(n), the determines that it is not the double talk state, and the double talk determining unit 83 supplies a resultant signal thereof to the controller 90.

(6) Thus, the controller 90 controls the adaptive echo remover 20 to suspend the adapting operation of the adaptive filter coefficient in the double talk state or continually performing the adapting operation thereof when it is not the double talk state.

If there exists only the echo signal in accordance with the signal outputted from the FET, the echo signal can be eliminated by the adaptive echo remover 20, thus telephone communication quality is guaranteed and also in the change of the echo path the echo signal can be eliminated by the operation of the echo remover 20. When the double talk state is detected in the double talk detector 80, the telephone communication maintains in a situation which the operation of the adaptive echo remover 20 is suspended and in this period the adaptive echo remover 20 is prevented from emitting filter coefficients.

With the above-described operation, the double talk and the change of the each path can be distinguished without time delay, and since the double talk is detected using the near end signal, the detecting operation is performed much faster than the conventional art. Also, the present invention can be applied to a long-distance call as well as the hand-free communication system.

As described above, the acoustic echo control system according to the present invention accurately detects the double talk section and the change of the each path using the grid prediction unit and in the double talk section which is detected prevents the adaptive echo remover from performing the filter coefficient adaption, thereby improving telephone communication quality. Further, when the echo path is changed, the filter coefficient adaption is performed without time delay and thus the echo signal is promptly eliminated.

It will be apparent to those skilled in the art that various modifications and variations can be made in the acoustic echo control system and the double talk control method thereof of the present invention without departing from the spirit or scope of the invention. Thus, it is intended that the present invention cover the modifications and variations of this invention provided they come within the scope of the appended claims and their equivalents:

What is claimed is:

1. An acoustic echo control system, comprising:
   an adaptive echo remover estimating an echo signal which corresponds to a far end signal from a far end talker and generating the estimated echo signal;
   a double talk detecting unit detecting a double talk state in accordance with a near end talker signal, the far end signal and the echo signal thereof; and
   a control unit suspending an operation of the adaptive echo remover in the double talk state in accordance with an output signal from the double talk detecting unit.

2. The system of claim 1, wherein the double talk detecting unit comprises:
   a double talk detecting lattice prediction unit receiving a near end signal in which the near end talker signal is compounded with the echo signal as an input signal and computing a reflection coefficient variation which indicates a characteristic of a sound signal;
   a threshold value determining lattice prediction unit receiving the near end signal and estimating a reflection coefficient variation with respect to the far end signal using the reflection coefficient variation of the sound signal, thereby computing a threshold value for the double talk detection; and
   a double talk determining unit receiving and comparing output signals from the double talk detecting and threshold value determining lattice prediction units and accordingly determining the double talk state.

3. The system of claim 2, wherein the reflection coefficient variation of the input signal is computed by an equation $$D_z(n) = \frac{\sum_{i=1}^{r}[K_i(n) - K_i(n-T)]^2}{\sum_{i=1}^{r}[K_i(n)]^2} \times 100$$

wherein r is a degree in which there is a reflection coefficient having an effective value in the lattice prediction unit comprised of pth degree, K is a parameter indicating the characteristic of the voice signal, $K_i(n)$ is a reflection coefficient in a discrete time n and $K_i(n-T)$ is a reflection coefficient from a time n to a sample T.

4. The system of claim 2, wherein the threshold value is computed by an equation $$D_{th}(n) = y \times \max \{D_x(n-C), D_x[n-(C+1)], \ldots, D_x(n-M)\},$$

wherein y is a constant, C is a value which time delay due to a direct path of the echo path is considered and M is a range of a previous value which is under consideration for effects of an indoor space.

5. The system of claim 4, wherein y is larger than 1 and is set up considering an echo signal-to-noise ratio.

6. A double talk detector of an acoustic echo control system, the double talk detector comprising:
   a double talk detecting lattice prediction unit receiving a near end signal in which a near end talker signal is compounded with an echo signal according to a far end signal from a far end talker as an input signal and computing a reflection coefficient variation which indicates a characteristic of a sound signal;
   a threshold value determining lattice prediction unit receiving the near end signal and estimating a reflection coefficient variation with respect to the far end signal using the reflection coefficient variation of the sound signal, thereby computing a threshold value for the double talk detection; and
   a double talk determining unit receiving and comparing output signals from the double talk detecting and threshold value determining lattice prediction units and accordingly determining a double talk state.

7. A double talk control method of an acoustic echo control system, comprising:
   computing a reflection coefficient variation of a far end signal from a far end talker and a reflection coefficient variation of a near end signal in which a near end talker signal and an echo signal in accordance with the far end signal are compounded;
   computing a threshold value for detecting a double talk state from the reflection coefficient variation of the far end signal;
   comparing the threshold value and the reflection coefficient variation of the near end signal; and
   suspending a filter coefficient adapting operation of an adaptive echo remover which generates an estimated echo signal from the echo signal when the reflection coefficient variation of the near end signal is larger than the threshold value, or eliminating the echo signals by adapting filter coefficients when the reflection coefficient variation is not larger than the threshold value.

8. A double talk detecting method of an acoustic echo control system, comprising:
   computing a reflection coefficient variation of a far end signal from a far end talker and a reflection coefficient variation of a near end signal in which a near end talker signal and an echo signal in accordance with the far end signal are compounded;
   computing a threshold value for detecting a double talk state from the reflection coefficient variation of the far end signal;
   comparing the threshold value and the reflection coefficient variation of the near end signal; and
   when the reflection coefficient variation of the near end signal is larger than the threshold value, determining that a double talk is generated and detecting the double talk.

9. The double talk detector of claim 6, wherein the threshold value is computed by an equation:

$$D_{th}(n) = y \times \max \{D_x(n-C), D_x[n-(C+1)], \ldots, D_x(n-M)\},$$

wherein y is a constant, C is a value which time delay due to a direct path of the echo path is considered and M is a range of a previous value which is under consideration for effects of an indoor space.

10. The double talk detector of claim 9, wherein y is larger than 1 and is set up considering an echo signal-to-noise ratio.

11. An acoustic echo control method, comprising:

estimating, by an adaptive echo remover, an echo signal which corresponds to a far end signal from a far end talker and generating the estimated echo signal;

detecting, by a double talk detecting unit, a double talk state in accordance with a near end talker signal, the far end signal and the echo signal thereof; and suspending an operation of the adaptive echo remover in the double talk state in accordance with an output signal from the double talk detecting unit.

12. The method of claim 11, wherein the double talk detecting step comprises:

receiving a near end signal in which the near end talker signal is compounded with the echo signal as an input signal; and computing a reflection coefficient variation which indicates a characteristic of a sound signal.

13. The method of claim 12, wherein the double talk detecting step further comprises:

receiving the near end signal and estimating a reflection coefficient variation with respect to the far end signal using the computed reflection coefficient variation of the sound signal, thereby computing a threshold value for the double talk detection.

14. The method of claim 13, wherein the double talk detecting step further comprises:

receiving and comparing output signals from the computing steps and accordingly determining the double talk state.

15. The method hod of claim 11, wherein the threshold value is computer by an equation:

$$D_{th}(n) = y \times \max \{D_x(n-C), D_x[n-(C+1)], \ldots D_x(n-M)\},$$

wherein Y is a constant, C is a value which time delay due to a direct path of the echo path is considered and M is a range of a previous value which is under consideration for effects of an indoor space.

16. The method of claim 15, wherein y is larger than 1 and is set up considering an echo signal-to-noise ratio.

* * * * *